US012802846B2

(12) United States Patent
Yamamoto et al.

(10) Patent No.: US 12,802,846 B2
(45) Date of Patent: Nov. 17, 2026

(54) IRON-BASED POWDER FOR DUST CORE, DUST CORE, AND METHOD OF MANUFACTURING DUST CORE

(71) Applicant: JFE STEEL CORPORATION, Tokyo (JP)

(72) Inventors: Naoki Yamamoto, Tokyo (JP); Takuya Takashita, Tokyo (JP); Makoto Nakaseko, Tokyo (JP); Shigeru Unami, Tokyo (JP)

(73) Assignee: JFE STEEL CORPORATION, Tokyo (JP)

( * ) Notice: Subject to any disclaimer, the term of this patent is extended or adjusted under 35 U.S.C. 154(b) by 979 days.

(21) Appl. No.: 18/000,288

(22) PCT Filed: Apr. 27, 2021

(86) PCT No.: PCT/JP2021/016849

§ 371 (c)(1),
(2) Date: May 24, 2023

(87) PCT Pub. No.: WO2021/256097

PCT Pub. Date: Dec. 23, 2021

(65) Prior Publication Data

US 2023/0290552 A1 Sep. 14, 2023

(30) Foreign Application Priority Data

Jun. 19, 2020 (JP) ................................ 2020-106588

(51) Int. Cl.
*H01F 27/255* (2006.01)
*H01F 1/20* (2006.01)
*H01F 41/02* (2006.01)

(52) U.S. Cl.
CPC ............ *H01F 1/20* (2013.01); *H01F 27/255* (2013.01); *H01F 41/0246* (2013.01)

(58) Field of Classification Search
CPC ...... H01F 1/20; H01F 27/255; H01F 41/0246; H01F 1/15308; H01F 3/08; H01F 1/153; B22F 1/102; B22F 1/16; B22F 1/08; B22F 9/002; B22F 2009/0828; B22F 1/05; B22F 1/068; B22F 3/02; B22F 3/03; C22C 2202/02; C22C 33/0264; C22C 38/00; C22C 45/02; C22C 1/04
USPC ............................ 336/65, 83, 200, 212, 233
See application file for complete search history.

(56) References Cited

U.S. PATENT DOCUMENTS

| | | | |
|---|---|---|---|
| 7,416,795 B2 | 8/2008 | Takaya et al. | |
| 11,600,414 B2 | 3/2023 | Yamamoto et al. | |
| 11,854,725 B2 * | 12/2023 | Kuroda | C22C 38/02 |
| 2002/0189401 A1 | 12/2002 | Takaya et al. | |
| 2018/0169759 A1 | 6/2018 | Nakamura et al. | |
| 2020/0243238 A1 | 7/2020 | Kato et al. | |
| 2021/0031268 A1 | 2/2021 | Nakamura et al. | |

FOREIGN PATENT DOCUMENTS

| | | | | |
|---|---|---|---|---|
| CN | 1387969 A | | 1/2003 | |
| CN | 107851507 A | | 3/2018 | |
| CN | 111246952 A | | 6/2020 | |
| EP | 3059744 A1 | | 8/2016 | |
| EP | 3666419 A1 | | 6/2020 | |
| JP | 2002356708 A | | 12/2002 | |
| JP | 2004156134 A | * | 6/2004 | C22C 45/02 |
| JP | 2010212442 A | | 9/2010 | |
| JP | 2015167183 A | | 9/2015 | |
| JP | 2016003366 A | * | 1/2016 | |
| JP | 2016015357 A | | 1/2016 | |
| JP | 2017034069 A | * | 2/2017 | |
| JP | 7529595 B2 | * | 8/2024 | H01F 1/26 |
| WO | 2017022227 A1 | | 2/2017 | |
| WO | 2019031463 A1 | | 2/2019 | |
| WO | 2019031464 A1 | | 2/2019 | |
| WO | 2020026949 A1 | | 2/2020 | |

OTHER PUBLICATIONS

Oct. 12, 2023, the Extended European Search Report issued by the European Patent Office in the corresponding European Patent Application No. 21826313.5.

Apr. 26, 2025, Office Action issued by the China National Intellectual Property Administration in the corresponding Chinese Patent Application No. 202180039257.6 with English language search report.

May 27, 2025, Office Action issued by the Korean Intellectual Property Office in the corresponding Korean Patent Application No. 10-2022-7042673 with English language concise statement of relevance.

Jul. 5, 2022, Notification of Reasons for Refusal issued by the Japan Patent Office in the corresponding Japanese Patent Application No. 2021-539383 with English language Concise Statement of Relevance.

Jun. 29, 2021, International Search Report issued in the International Patent Application No. PCT/JP2021/016849.

* cited by examiner

*Primary Examiner* — Tuyen T Nguyen
(74) *Attorney, Agent, or Firm* — KENJA IP LAW PC

(57) ABSTRACT

Provided is an iron-based powder for dust core with which a dust core with low iron loss and high insulation properties can be obtained. In the iron-based powder for dust core of the present disclosure, a median particle size calculated based on cumulative volume frequency of particles of the iron-based powder for dust core is 150 μm or less, and cumulative volume frequency of the particles with an aspect ratio of 0.70 or less is 70% or less, and a median aspect ratio calculated based on cumulative volume frequency is 0.60 or more.

18 Claims, No Drawings

IRON-BASED POWDER FOR DUST CORE, DUST CORE, AND METHOD OF MANUFACTURING DUST CORE

TECHNICAL FIELD

This disclosure relates to an iron-based powder for dust core, a dust core, and a method of manufacturing a dust core.

BACKGROUND

Powder metallurgical technique provides higher dimensional accuracy in the manufacture of parts with complicated shapes and less waste of raw materials than a steel melting method, and therefore the technique is applied to the manufacture of various parts. Examples of a product manufactured by the powder metallurgical technique include a dust core. A dust core is a magnetic core manufactured by pressing powder, and it is used for, for example, iron cores in reactors and other devices. In recent years, because of compact size and improved cruising distance of vehicles, especially hybrid vehicles and electric vehicles, reactors and other components are required to have excellent magnetic properties, and dust cores used therein are also required to have better magnetic properties. Therefore, dust cores obtained by coating ferromagnetic metal powder, which has high magnetic flux density and low iron loss, with an insulating coating and subjecting the powder to pressing have already been in practical use.

To achieve low iron loss in dust cores, the coercive force of metal powder particles is reduced, and an insulating coating on the surface of metal powder particles in a green compact obtained by pressing is reduced and damaged, for example. Techniques focusing on the shape of metal powder particle have been proposed as a means to achieve this purpose.

For example, JP 2016-15357 A (PTL 1) describes that, by using amorphous alloy particles with an average particle aspect ratio (as used herein, it means major axis diameter/minor axis diameter) of 1 or more and 3 or less, the filling rate is increased during pressing because the particles have a relatively spherical shape, thereby obtaining a dust core with high saturation magnetic flux density.

Further, J P 2015-167183 A (PTL 2) describes that, by using nanocrystalline soft magnetic alloy particles with a particle aspect ratio (as used herein, it means major axis diameter/minor axis diameter) of more than 1.0 and 2.6 or less, the core loss in high frequency ranges is reduced.

CITATION LIST

Patent Literature

PTL 1: JP 2016-15357 A
PTL 2: JP 2015-167183 A

SUMMARY

Technical Problem

However, it is understood that the particle number standard is used to calculate the average aspect ratio (as used herein, it means major axis diameter/minor axis diameter) in the techniques of PTLS 1 and 2. In this case, even if the average value of the aspect ratio (as used herein, it means major axis diameter/minor axis diameter) is within a predetermined range based on such a standard, there may be particles with an extremely low aspect ratio (as used herein, it means major axis diameter/minor axis diameter) and particles with an extremely high aspect ratio (as used herein, it means major axis diameter/minor axis diameter), which may cause problems such as failing to obtain desired magnetic properties.

It could thus be helpful to provide an iron-based powder for dust core with which a dust core with low iron loss and high insulation properties can be obtained.

Solution to Problem

Regarding the properties of powder, we take a ratio of the minor axis diameter to the major axis diameter of the projected image of a particle as an aspect ratio (that is, minor axis diameter/major axis diameter), focus on the aspect ratio distribution of the volume frequency of all the powder particles and the median value of the aspect ratio, use the cumulative volume frequency of particles having a predetermined aspect ratio and the median value of the aspect ratio of all particles as two indicators, and set specific ranges for these indicators. As a result, we found that it is possible to produce a dust core with low iron loss and high insulation properties. The present disclosure is based on the above findings. We thus provide the following.

[1] An iron-based powder for dust core, wherein
- a median particle size calculated based on cumulative volume frequency of particles of the iron-based powder for dust core is 150 μm or less, and
- cumulative volume frequency of the particles with an aspect ratio of 0.70 or less is 70% or less, and a median aspect ratio calculated based on cumulative volume frequency is 0.60 or more.

[2] The iron-based powder for dust core according to [1], wherein a maximum particle size of the particles is 500 μm or less.

[3] The iron-based powder for dust core according to [1] or [2], comprising a soft magnetic powder whose chemical composition is, other than inevitable impurities, represented by a composition formula of $Fe_aSi_bB_cP_dCu_eM_f$, wherein $79 \text{ at } \% \leq a \leq 84.5 \text{ at } \%$,
$0 \text{ at } \% \leq b < 6 \text{ at } \%$,
$0 \text{ at } \% < c \leq 10 \text{ at } \%$,
$4 \text{ at } \% < d \leq 11 \text{ at } \%$,
$0.2 \text{ at } \% \leq e \leq 1.0 \text{ at } \%$,
$0 \text{ at } \% \leq f \leq 4 \text{ at } \%$
$a+b+c+d+e+f=100 \text{ at } \%$, and M is at least one element selected from the group consisting of Nb, Mo, Ni, Sn, Zr, Ta, W, Hf, Ti, V, Cr, Mn, C, Al, S, O, and N.

[4] The iron-based powder for dust core according to any one of [1] to [3], comprising an insulating coating on a surface of particles of the iron-based powder for dust core.

[5] A dust core which is a pressed body of the iron-based powder for dust core according to any one of [1] to [4].

[6] A method of manufacturing a dust core, comprising charging the iron-based powder for dust core according to any one of [1] to [4] into a press mold and pressing the powder.

The reasons why the iron-based powder for dust core of the present disclosure can produce a dust core with low iron loss and high insulation properties are inferred as follows.

In the iron-based powder for dust core of the present disclosure, the proportion of particles with an extremely low aspect ratio is small, and the median value of the aspect ratio is large. Therefore, the particle surface roughness that may serve as a pinning site of magnetic domain wall is reduced in one particle, which facilitates domain wall displacement. As a result, the coercive force is reduced, and thus the hysteresis loss is reduced.

Further, the high aspect ratio of the powder particles reduces the damage to an insulation coating of the powder particles in a green compact and also reduces conduction between the powder particles, thereby reducing the eddy current loss. Furthermore, the powder particles with a high aspect ratio have high flowability, which facilitates the filling of the powder to a press mold during the manufacture of dust cores, promotes the rearrangement of particles within the powder during green compacting by pressing, and also reduces friction between the press mold and the particles. This facilitates the displacement of the powder on the domain wall of the press mold, renders the compacting easy, and enables the manufacture of high-density dust cores.

Increasing the compressed density can reduce the iron loss.

Advantageous Effect

According to the iron-based powder for dust core of the present disclosure, it is possible to provide a dust core with low iron loss and high insulation properties.

DETAILED DESCRIPTION

The following describes embodiments of the present disclosure. Note that the following description merely represents a preferred example, and the present disclosure is by no means limited to the description.

<Iron-Based Powder for Dust Core>

An iron-based powder for dust core (hereinafter also referred to as "iron-based powder"), which is one embodiment of the present disclosure, has a median particle size of 150 μm or less calculated based on the cumulative volume frequency of particles constituting the powder, where the cumulative volume frequency of the particles with an aspect ratio of 0.70 or less is 70% or less, and the median aspect ratio calculated based on the cumulative volume frequency is 0.60 or more. As used herein, the term "iron-based powder" refers to a metal powder containing Fe in an amount of 50 mass % or more.

[Median Particle Size]

In the iron-based powder of the present disclosure, the median particle size $D_{50}$ calculated based on the cumulative volume frequency of particles constituting the powder is 150 μm or less. When the particles are fine particles with a median particle size $D_{50}$ equal to or lower than the upper limit, the fluidity of the powder increases, the filling density in a press mold improves, which can improve the density of a dust core and sufficiently reduce the iron loss. Further, fine particles can reduce eddy current loss, which is also advantageous in reducing iron loss. The median particle size $D_{50}$ is preferably 100 μm or less. On the other hand, the median particle size $D_{50}$ may be 3 μm or more and preferably 5 μm or more from the viewpoint of uniformly coating the powder with a resin.

Methods of measuring the particle size and calculating the median particle size $D_{50}$ based on the cumulative volume frequency are as follows.

To measure the particle size, the powder to be measured is put into a solvent (such as ethanol), dispersed by ultrasonic oscillation for 30 seconds or longer, and the particle size distribution based on the particle volume is measured with a laser diffraction-type particle size distribution measuring device by laser diffraction-scattering. The cumulative particle size distribution is calculated from the obtained particle size distribution, and the particle size of a particle corresponding to 50% of the total volume of all particles is taken as the median value $D_{50}$, which is used as a representative value of the particle size of the powder.

[Aspect Ratio]

The aspect ratio (A) in the present disclosure is a value defined by the following equation (1).

$$A=W/L \tag{1}$$

where

A is the aspect ratio,

W is the minor axis diameter of one particle in unit of meter, and

L is the major axis diameter of one particle in unit of meter.

The aspect ratio is measured as follows.

The powder to be measured is dispersed on a flat surface (such as the surface of a glass plate) by, for example, compressed air, and the image of each particle is captured by a microscope. The total number of particles in the powder to be measured should be 1000 or more.

The captured images are analyzed by computer, and the projected area, minor axis diameter and major axis diameter are measured for the projected image of each particle. The major axis diameter is the maximum length that can be captured in the projected image of the particle, and the minor axis diameter is the maximum length in the direction perpendicular to the maximum length. The measurement result is substituted into the equation (1) to calculate the aspect ratio of each particle.

The diameter of a circle that has the same area as the projected area of each particle (circle equivalent diameter) is calculated, and the volume of a sphere that has the same diameter as the circle equivalent diameter is calculated. In this way, the aspect ratio and the volume of each particle are obtained, the volume frequency at each aspect ratio can be calculated, and the cumulative volume frequency (volume fraction) of particles with an aspect ratio of 0.70 or less can be determined.

The aspect ratio of all measured particles in the powder is arranged in ascending order, and the median value of a particle corresponding to 50% of the total volume of all particles is taken as $A_{50}$. Since the upper limit of the aspect ratio is 1 by its definition, the median aspect ratio is 1 or less.

In the iron-based powder of the present disclosure, the cumulative volume frequency (volume fraction) of particles constituting the powder with an aspect ratio of 0.70 or less is 70% or less, and the median aspect ratio $A_{50}$ calculated based on the cumulative volume frequency is 0.60 or more. If either or both of these conditions are not satisfied, the volume frequency of misshapen particles whose shape deviates from a spherical shape is increased, which increases the coercive force of the particles, and the damage to an insulation coating of the particles is increased to cause an increase in hysteresis loss of a dust core and an increase in eddy current loss between particles, which ultimately increases the iron loss. It is preferable that the cumulative volume frequency with an aspect ratio of 0.70 or less should be 60% or less and that the median aspect ratio $A_{50}$ calculated based on the cumulative volume frequency should be 0.65 or more. The cumulative volume frequency with an aspect ratio of 0.70 or less may be 0%. Further, the upper limit of the median aspect ratio $A_{50}$ calculated based on the cumulative volume frequency is 1, and it may be 1.

[Maximum Particle Size]

The iron-based powder of the present disclosure preferably has a maximum particle size of 500 μm or less. When the maximum particle size is 500 μm or less, as the particle sizes of all powder particles are uniformed to some extent, the segregation of particles such as particles with similar particle sizes gathering close to each other is prevented, the number of fine particles adhering to the surface of coarse particles is decreased, and the density and the strength of a dust core can be increased because fine particles enter the gaps between coarse particles. As a result, the iron loss is reduced. On the other hand, the maximum particle size may be 10 μm or more from the viewpoint of uniform resin coating on the powder. The maximum particle size is the maximum value of the particle size distribution when measured by a laser diffraction-type particle size distribution measuring device, and the measurement conditions are the same as for the measurement of $D_{50}$ described above. From the viewpoint of particle uniformity, the maximum particle size is preferably twice the $D_{50}$ or less and more preferably 1.5 times the $D_{50}$ or less.

[Chemical Composition]

The iron-based powder of the present disclosure preferably contains a soft magnetic powder whose chemical composition is, excluding inevitable impurities, represented by a composition formula of $Fe_aSi_bB_cP_dCu_eM_f$, where 79 at %≤a≤84.5 at %, 0 at %≤b<6 at %, 0 at %<c≤10 at %, 4 at %<d≤11 at %, 0.2 at %≤e≤1.0 at %, 0 at %<f≤4 at % a+b+c+d+e+f=100 at %, and

M is at least one element selected from the group consisting of Nb, Mo, Ni, Sn, Zr, Ta, W, Hf, Ti, V, Cr, Mn, C, Al, S, O, and N. With this composition, it is possible to suppress the crystallinity of the powder to 10% or less, and nanocrystals of bccFe can be precipitated to further improve the magnetic properties after heat treatment.

A soft magnetic powder may contain inevitable impurities that are inevitably mixed in during the manufacturing or the like, but the composition formula above excludes inevitable impurities.

Fe is an essential element for magnetism, and the proportion of Fe may be 79 at % or more. It is preferably 80 at % or more. Further, it may be 84.5 at % or less. It is preferably 83.5 at % or less.

Si is an element responsible for amorphous phase formation, and the proportion of Si may be less than 6 at % (including zero). It is preferably 2 at % or more. Further, it is more preferably 5.5 at % or less.

B is an element responsible for amorphous phase formation, and the proportion of B may be 4 at % or more. It is preferably 5 at % or more. Further, it may be 10 at % or less. It is preferably 9 at % or less.

P is an element responsible for amorphous phase formation, and the proportion of P may be more than 4 at %. It is preferably more than 5 at %. Further, it may be 11 at % or less. It is preferably 10 at % or less.

Cu is an element that contributes to nanocrystalization, and the proportion of Cu may be 0.2 at % or more. It is preferably 0.3 at % or more. Further, it may be 1.0 at % or less. It is preferably 0.9 at % or less.

In addition to the elements listed above, it is possible to contain at least one element selected from the group consisting of Nb, Mo, Ni, Sn Zr, Ta, W, Hf, Ti, V, Cr, Mn, C, Al, S, O, and N. The proportion of these elements may be 4 at % or less (including zero).

[Manufacture of Powder]

The iron-based powder of the present disclosure can be manufactured using a water atomizing method or gas atomization, in which water or gas is sprayed onto molten metal to form a spray, which is then cooled and solidified. Alternatively, it can be obtained by processing a powder obtained by a grinding method or an oxide reduction method.

In the case of using a water atomizing method or gas atomization, the aspect ratio can be set to a predetermined range by adjusting the pressure of a gas that blows the water or gas to a low pressure. Alternatively, the aspect ratio can be adjusted by smoothing the particle surface or by removing particles with low circularity by sieve classification. For example, the iron-based powder of the present disclosure can also be obtained by smoothing the particle surface of powder obtained with a grinding method or an oxide reduction method, or with a water atomizing method or gas atomization at normal high pressure, and/or by removing particles with low aspect ratio by sieve classification.

When the iron-based powder of the present disclosure is a powder containing a soft magnetic powder with a given composition formula, it can be manufactured by adjusting raw materials to obtain the specified composition. For example, when using a water atomizing method or gas atomization, raw materials are weighed to obtain the specified composition and melted to obtain molten alloy, and the molten alloy is discharged from a nozzle, sprayed with water or gas to form a spray, which is then cooled and solidified, and processed, if necessary, to obtain the desired powder.

[Insulating Coating]

The iron-based powder for dust core of the present disclosure can be provided with an insulating coating on the surface of particles constituting the iron-based powder for dust core.

The insulation coating is not particularly limited, and it may be an inorganic insulation coating or an organic insulating coating. Either or both of these may be used.

The inorganic insulating coating is preferably a coating containing an aluminum compound and more preferably a coating containing aluminum phosphate. The inorganic insulation coating may be a chemical conversion layer.

The organic insulation coating is preferably an organic resin coating. Examples of the organic resin coating include silicone resin, phenol resin, epoxy resin, polyamide resin, and polyimide resin. These may be contained alone or contained in any ratio of two or more. Among the above, a coating containing silicone resin is more preferred.

The insulation coating may be a single-layer coating or a multilayer coating containing two or more layers. The multilayer coating may be a multilayer coating containing one type of coating or a multilayer coating containing different types of coatings.

Examples of the silicone resin include, but are not limited to, brands of SH805, SH806A, SH840, SH997, SR620, SR2306, SR2309, SR2310, SR2316, DC12577, SR2400, SR2402, SR2404, SR2405, SR2406, SR2410, SR2411, SR2416, SR2420, SR2107, SR2115, SR2145, SH6018, DC-2230, DC3037 and QP8-5314 manufactured by Dow Corning Toray Co., Ltd., and brands of KR-251, KR-255, KR-114A, KR-112, KR-2610B, KR-2621-1, KR-230B, KR-220, KR-285, K295, KR-2019, KR-2706, KR-165, KR-166, KR-169, KR-2038, KR-221, KR-155, KR-240, KR-101-10, KR-120, KR-105, KR-271, KR-282, KR-311, KR-211, KR-212, KR-216, KR-213, KR-217, KR-9218, SA-4, KR-206, ES-1001N, ES-1002T, ES1004, KR-9706, KR-5203 and KR-5221 manufactured by Shin-Etsu Chemical Co., Ltd. These may be used alone or used in any ratio of two or more.

The aluminum compound may be any compound containing aluminum, and examples thereof include phosphates, nitrates, acetates and hydroxides of aluminum. These may be used alone or used in any ratio of two or more.

The coating containing an aluminum compound may be a coating mainly composed of an aluminum compound or may be a coating consisting of an aluminum compound. The coating may further contain a metal compound containing a metal other than aluminum. Examples of the metal other than aluminum include Mg, Mn, Zn, Co Ti, Sn, Ni, Fe, Zr, Sr, Y, Cu, Ca, V, and Ba. These may be used alone or used in any ratio of two or more. Examples of the metal compound containing a metal other than aluminum include phosphates, carbonates, nitrates, acetates, and hydroxides. These may be used alone or used in any ratio of two or more. The metal compound is preferably soluble in a solvent such as water and more preferably a water-soluble metal salt.

When the phosphorus content in a coating containing an aluminum-containing phosphate or phosphoric acid compound is defined as "P" (mol) and the total content of all metal elements in the coating is defined as "M" (mol), a ratio of P to M (P/M) is preferably 1 or more and less than 10. When the P/M is 1 or more, the chemical reaction proceeds sufficiently on the surface of the iron-based powder during coating formation, and the strength and insulation properties of a dust core can be further improved through the improvement of adhesion of the coating. On the other hand, when the P/M is less than 10, no free phosphoric acid remains after coating formation, and corrosion of the iron-based powder can be sufficiently prevented. The P/M is more preferably 1 to 5. The P/M is more preferably 2 to 3 from the viewpoint of effectively preventing variations in specific resistance and instability.

When the aluminum content in a coating containing an aluminum-containing phosphate or phosphoric acid compound is defined as "A" (mol), a ratio of A to M (mol) (A/M), where M is the total content of all metal elements in the coating, is preferably more than 0.3 and 1 or less. Within this range, there is sufficient aluminum that is highly reactive with phosphoric acid to suppress residual unreacted free phosphoric acid. The A/M is more preferably 0.4 or more and still more preferably 0.8 or more. Further, the A/M is preferably 1.0 or less.

The coating weight of the insulation coating is not particularly limited, but it is preferably 0.01 mass % or more and 10 mass % or less. When the coating weight is within the above range, a uniform coating can be formed, sufficient insulation properties can be ensured, and the proportion of iron-based powder in a dust core can be secured to obtain sufficient strength in a formed body and sufficient magnetic flux density.

The coating weight refers to a value defined by the following equation.

Coating weight (mass %)=(mass of insulation coating)/(mass of iron-based powder for dust core excluding mass of insulation coating)×100

The iron-based powder for dust core of the present disclosure may contain a substance different from the insulating coating in at least one of the following: within the insulating coating, under the insulating coating, and above the insulating coating. Examples of such a substance include a surfactant for wettability improvement, a binder for interparticle binding, and an additive for pH adjustment. The total amount of the substance with respect to the entire insulation coating is preferably 10 mass % or less.

A method of forming the insulation coating is not particularly limited, but it is preferable to form the insulation coating by wet processing. Examples of the wet processing include a method of mixing a coating solution for insulation coating formation with the iron-based powder.

The mixing method is not particularly limited, but it is preferably, for example, a method of agitating and mixing the iron-based powder and the coating solution in a tank such as an attritor or a Henschel mixer, or a method of supplying the coating solution with the iron-based powder in a fluid state by a rolling-flowing coating device or the like and mixing the coating solution and the iron-based powder.

All of the solution may be supplied to the iron-based powder before the mixing starts or immediately after the mixing starts, or the solution may be divided and supplied several times during the mixing. Alternatively, the coating solution may be continuously supplied during the mixing using a droplet feeder, a spray, or the like.

The supplying of the coating solution is not particularly limited, but it is preferable to use a spray. By using a spray, the coating solution can be spread evenly all over the iron-based powder, and the spray conditions can be adjusted to reduce the diameter of spray droplets to about 10 μm or less. As a result, it is possible to prevent the coating from becoming excessively thick and to easily form a uniform and thin insulation coating on the iron-based powder. On the other hand, agitation and mixing can also be performed in a fluidized tank such as a flowing granulator or a rolling granulator, or by an agitator-type mixer such as a Henschel mixer, which have an advantage of suppressing agglomeration of powder particles. From the viewpoint of forming a more uniform insulation coating on the iron-based powder, it is preferable to combine a fluidized tank or an agitator-type mixer with the supplying of the coating solution by a spray. Performing heat treatment in a mixer or after the mixing is advantageous in terms of promoting solvent drying and accelerating the reaction.

<Dust Core>

A dust core, which is another embodiment of the present disclosure, is a dust core produced using the iron-based powder for dust core described above.

A method of manufacturing the dust core is not particularly limited, and any method may be used. For example, a dust core can be obtained by charging the iron-based powder of the present disclosure into a press mold and pressing the powder to desired dimensions and shape. The iron-based powder preferably has an insulating coating.

The pressing is not particularly limited, and any method can be used. Examples thereof include cold molding and die lubrication molding.

The pressure can be appropriately determined according to the application. However, from the viewpoint that increasing the pressure increases the compressed density and improves the magnetic properties, it is preferably 490 MPa or more and more preferably 686 MPa or more.

A lubricant can be used during the pressing. The lubricant can be applied to the walls of a press mold or added to the iron-based powder. By using a lubricant, the friction between the press mold and the powder during the pressing can be reduced, and a decrease in the green density can be further suppressed. Furthermore, the friction upon removal from the press mold can also be reduced, thereby preventing cracks in a formed body (dust core) at the time of removal.

The lubricant is not particularly limited, and examples thereof include metallic soaps such as lithium stearate, zinc stearate, and calcium stearate, and wax such as fatty acid amide.

The resulting dust core may be subjected to heat treatment. By performing heat treatment, effects such as reducing hysteresis loss due to strain removal and increasing the strength of a formed body can be obtained. The heat treatment conditions can be appropriately determined, but the temperature is preferably 200° C. or higher and 700° C. or lower, and the time is preferably 5 minutes or longer and 300 minutes or shorter. The heat treatment may be performed in any atmosphere such as air, an inert atmosphere, a reducing atmosphere, or a vacuum. When raising or lowering the temperature during the heat treatment, a stage at which the temperature is maintained constant may be provided.

EXAMPLES

The following describes the present disclosure in more detail with reference to examples. Note that the present disclosure is not limited to the examples.

An iron-based powder was prepared by the following procedure.

An iron-based powder was produced by quenching solidification of a soft magnetic alloy amorphous powder with a composition of $Fe_{81.3}Si_3B_9P_6Cu_{0.7}$ or a soft magnetic alloy amorphous powder with a composition of $Fe_{81.6}Si_5B_5P_{7.5}Cu_{0.4}Ni_{0.5}$ with a water atomizing method. The produced powder was subjected to vacuum drying to obtain a dry powder.

The dry powder was classified, and the particle size and the aspect ratio were adjusted. An airflow classifier (Lab Classiel N-01 manufactured by Seishin Enterprise Co., Ltd.) was used for the classification, and a dispersion plate was rotated at a speed of 1000 rpm to 1650 rpm to classify the powder particles. Further, a powder produced only using a water atomizing method without classification by an airflow classifier was prepared as a powder for comparison (Comparative Examples 1 and 8).

The iron-based powder was evaluated as follows.

The dry powder was dispersed on a glass surface, and a microscope (Morphologi G3 manufactured by Spectris Co., Ltd.) was used to observe and photograph 5000 particles per sample. The microscope used a lens with a magnification of 10 times. Based on the calculated aspect ratio and volume frequency, the cumulative volume frequency (volume fraction) of particles with an aspect ratio of 0.70 or less and the median value $A_{50}$, which was a representative value of the aspect ratio of all the powder particles, were calculated. Further, the particle size and the volume frequency of the dried powder were measured after charging the soft magnetic alloy amorphous powder into ethanol as a solvent and dispersing the powder by ultrasonic vibration for one minute using a laser diffraction-type particle size distribution measuring device (LA-950V2 manufactured by HORIBA, Ltd.). The median value $D_{50}$, which was a representative value of particle size of all powder particles, was calculated based on the particle size and the volume frequency. The maximum particle size is the maximum value of the particle size distribution when measured by a laser diffraction-type particle size distribution measuring device.

A dust core was prepared by the following procedure.

A soft magnetic alloy amorphous powder was added with a solution for insulating coating and mixed with the solution. In this way, the powder was applied with an insulating coating, and a coated powder was obtained. The solution used was a 60 mass % silicone resin solution diluted by the addition of xylene, and it was used in an amount so that the amount of resin was 3 mass % with respect to the soft magnetic alloy amorphous powder. After mixing, the mixture was allowed to stand in an air atmosphere for 10 hours for drying. After drying, heat treatment was performed at 150° C. for 60 minutes to cure the resin.

Next, the coated soft magnetic alloy amorphous powder was filled into a press mold that had been coated with lithium stearate, and pressing was performed to obtain a dust core (outer diameter 38 mmφ×inner diameter 25 mmφ× height 6 mm). The pressure was set to 1470 MPa, and the pressing was performed once. To improve the strength of a formed body, the temperature was increased from room temperature at a rate of 3° C./minute in a furnace of $N_2$ atmosphere, and then the formed body was subjected to heat treatment at 400° C. for 20 minutes. After heat treatment, the formed body was taken out from the furnace in a $N_2$ atmosphere and then air-cooled to room temperature, and the resulting sample was used as a dust core.

The dust core was evaluated as follows.

The compressed density of each of the obtained dust cores was determined. The compressed density was calculated by measuring the mass of the dust core, calculating the volume of the dust core based on the dimensions, and dividing the mass by the volume.

The prepared dust core was wound with 100 turns on the primary side and 20 turns on the secondary side to obtain a sample for measurement. A hysteresis loop was drawn at a maximum magnetic flux density of 0.1 T and 50 Hz using a DC magnetization test device (Model SK-110 manufactured by Metron Technology Research Co., Ltd.), and the area was defined as the hysteresis loss. The measured hysteresis loss was multiplied by 400 to calculate the hysteresis loss at a magnetic flux density of 0.1 T and a frequency of 20 kHz. Further, a high-frequency iron loss measuring device (manufactured by Metron Technology Research Co., Ltd.) was used to measure the iron loss at 0.1 T and 20 kHz. The difference between the measured iron loss and the hysteresis loss was calculated as the eddy current loss.

The magnetic properties are evaluated as follows.

Excellent iron loss of 250 kW/$m^3$ or less

Good iron loss of 300 kW/$m^3$ or less and more than 250 kW/$m^3$

Poor iron loss of more than 300 kW/$m^3$

Table 1 lists the classification condition, evaluation of powder, and evaluation of dust core of Comparative Examples and Examples using a soft magnetic alloy amorphous powder of $Fe_{81.3}Si_3B_9P_6Cu_{0.7}$.

TABLE 1

| | Classification condition | Evaluation of powder | | | | Evaluation of dust core | | | | |
|---|---|---|---|---|---|---|---|---|---|---|
| | Rotation speed of dispersion plate (rpm) | Cumulative volume frequency with aspect ratio of 0.70 or less (%) | $A_{50}$ (-) | $D_{50}$ (μm) | Maximum particle size (μm) | Density ($g/cm^3$) | Iron loss ($kW/m^3$) | Hysteresis loss ($kW/m^3$) | Eddy current loss ($kW/m^3$) | Evaluation of magnetic property |
| Comparative Example 1 | — | 90 | 0.25 | 175 | 490 | 5.25 | 460 | 340 | 120 | Poor |
| Comparative Example 2 | 1000 | 85 | 0.30 | 145 | 452 | 5.30 | 430 | 320 | 110 | Poor |
| Comparative Example 3 | 1100 | 80 | 0.60 | 160 | 437 | 5.40 | 415 | 315 | 100 | Poor |
| Comparative Example 4 | 1150 | 75 | 0.62 | 150 | 405 | 5.42 | 410 | 310 | 100 | Poor |
| Comparative Example 5 | 1200 | 70 | 0.50 | 155 | 350 | 5.45 | 390 | 300 | 90 | Poor |
| Comparative Example 6 | 1250 | 67 | 0.55 | 145 | 305 | 5.51 | 370 | 295 | 75 | Poor |
| Comparative Example 7 | 1400 | 65 | 0.60 | 160 | 258 | 5.55 | 335 | 270 | 65 | Poor |
| Example 1 | 1500 | 63 | 0.61 | 145 | 181 | 5.63 | 290 | 240 | 50 | Good |
| Example 2 | 1550 | 61 | 0.63 | 140 | 165 | 5.65 | 280 | 240 | 40 | Good |
| Example 3 | 1600 | 60 | 0.65 | 95 | 116 | 5.70 | 245 | 210 | 35 | Excellent |
| Example 4 | 1650 | 55 | 0.66 | 90 | 113 | 5.72 | 240 | 210 | 30 | Excellent |

It is understood from Table 1 that, in the case of using the powders of Examples where the $D_{50}$ was 150 μm or less, the cumulative volume frequency (volume fraction) with an aspect ratio of 0.70 or less was 70% or less, and the median aspect ratio $A_{50}$ was 0.60 or more, the iron loss of the dust core was 300 $kW/m^3$ or less, and the powder used was an excellent iron-based powder for dust core.

Focusing on the hysteresis loss and the eddy current loss, it is understood that all Examples had lower iron loss and better properties than Comparative Examples. The reason is as follows. The powders of Examples had fewer low-aspect-ratio particles with an aspect ratio of 0.70 or less than that of Comparative Examples, and the $A_{50}$, which indicated the aspect ratio of the entire powder, was high, meaning there were many particles close to spherical. As a result, the coercive force of the particles was lowered, so that the hysteresis loss was reduced, and the damage to the insulating coating on the particle surface when used as a dust core was also reduced, so that the eddy current loss between the particles was reduced.

It is understood that, in Examples 3 and 4 where a powder whose cumulative volume frequency (volume fraction) with an aspect ratio of 0.70 or less was 60% or less, $A_{50}$ was 0.65 or more, and $D_{50}$ was 100 μm or less was used, the iron loss of the dust core was 250 $kW/m^3$ or less, and the powder used was a better iron-based powder for dust core than others.

Table 2 lists the classification condition, evaluation of powder, and evaluation of dust core of Comparative Examples and Examples using a soft magnetic alloy amorphous powder of $Fe_{81.6}Si_5B_5P_{7.5}Cu_{0.4}Ni_{0.5}$.

TABLE 2

| | Classification condition | Evaluation of powder | | | | Evaluation of dust core | | | | |
|---|---|---|---|---|---|---|---|---|---|---|
| | Rotation speed of dispersion plate (rpm) | Cumulative volume frequency with aspect ratio of 0.70 or less (%) | $A_{50}$ (-) | $D_{50}$ (μm) | Maximum particle size (μm) | Density ($g/cm^3$) | Iron loss ($kW/m^3$) | Hysteresis loss ($kW/m^3$) | Eddy current loss ($kW/m^3$) | Evaluation of magnetic property |
| Comparative Example 8 | — | 90 | 0.25 | 180 | 495 | 5.28 | 460 | 345 | 115 | Poor |
| Comparative Example 9 | 1000 | 84 | 0.30 | 150 | 460 | 5.32 | 420 | 315 | 105 | Poor |
| Comparative Example 10 | 1100 | 78 | 0.61 | 155 | 435 | 5.42 | 410 | 310 | 100 | Poor |
| Comparative Example 11 | 1150 | 74 | 0.63 | 150 | 408 | 5.45 | 405 | 310 | 95 | Poor |
| Comparative Example 12 | 1200 | 68 | 0.50 | 155 | 356 | 5.48 | 390 | 300 | 90 | Poor |
| Comparative Example 13 | 1250 | 66 | 0.55 | 145 | 305 | 5.53 | 360 | 290 | 70 | Poor |
| Comparative Example 14 | 1400 | 63 | 0.60 | 155 | 255 | 5.57 | 330 | 270 | 60 | Poor |
| Example 5 | 1500 | 62 | 0.61 | 140 | 170 | 5.65 | 280 | 235 | 45 | Good |
| Example 6 | 1550 | 61 | 0.63 | 135 | 160 | 5.68 | 270 | 230 | 40 | Good |
| Example 7 | 1600 | 58 | 0.66 | 90 | 115 | 5.71 | 240 | 205 | 35 | Excellent |
| Example 8 | 1650 | 54 | 0.67 | 85 | 110 | 5.74 | 230 | 200 | 30 | Excellent |

It is understood from Table 2 that, in the case of using the powders of Examples where the $D_{50}$ was 150 μm or less, the cumulative volume frequency (volume fraction) with an aspect ratio of 0.70 or less was 70% or less, and the $A_{50}$ was 0.60 or more, the iron loss of the dust core was 300 $kW/m^3$ or less, and the powder used was an excellent iron-based powder for dust core.

Focusing on the hysteresis loss and the eddy current loss, it is understood that all Examples had lower iron loss and better properties than Comparative Examples. The reason is as follows. The powders of Examples had fewer low-aspect-ratio particles with an aspect ratio of 0.70 or less than that of Comparative Examples, and the $A_{50}$, which indicated the aspect ratio of the entire powder, was high, meaning there were many particles close to spherical. As a result, the coercive force of the particles was lowered, so that the hysteresis loss was reduced, and the damage to the insulating coating on the particle surface when used as a dust core was also reduced, so that the eddy current loss between the particles was reduced.

It is understood that, in Examples 7 and 8 where a powder whose cumulative volume frequency (volume fraction) with an aspect ratio of 0.70 or less was 60% or less, $A_{50}$ was 0.65 or more, and $D_{50}$ was 100 μm or less was used, the iron loss of the dust core was 250 kW/m$^3$ or less, and the powder used was a better iron-based powder for dust core than others.

INDUSTRIAL APPLICABILITY

A dust core using the iron-based powder for dust core of the present disclosure has low iron loss and high insulation properties, which is highly useful.

The invention claimed is:

1. An iron-based powder for dust core, wherein a median particle size calculated based on cumulative volume frequency of particles of the iron-based powder for dust core is 150 μm or less, and cumulative volume frequency of the particles with an aspect ratio of 0.70 or less is 70% or less, and a median aspect ratio calculated based on cumulative volume frequency is 0.60 or more, and the iron-based powder for dust core comprises a soft magnetic powder whose chemical composition is, other than inevitable impurities, represented by a composition formula of $Fe_aSi_bB_cP_dCu_eM_f$, wherein 79 at %≤a≤84.5 at %, 0 at %≤b<6 at %, 0 at %<c≤10 at %, 4 at %<d≤11 at %, 0.2 at %≤e≤1.0 at %, 0 at %≤f≤4 at %, a+b+c+d+e+f=100 at %, and M is at least one element selected from the group consisting of Nb, Mo, Ni, Sn, Zr, Ta, W, Hf, Ti, V, Cr, Mn, C, Al, S, O, and N.

2. The iron-based powder for dust core according to claim 1, wherein a maximum particle size of the particles is 500 μm or less.

3. The iron-based powder for dust core according to claim 1, comprising an insulating coating on a surface of particles of the iron-based powder for dust core.

4. A dust core which is a pressed body of the iron-based powder for dust core according to claim 1.

5. A method of manufacturing a dust core, comprising charging the iron-based powder for dust core according to claim 1 into a press mold and pressing the powder.

6. The iron-based powder for dust core according to claim 2, comprising an insulating coating on a surface of particles of the iron-based powder for dust core.

7. A dust core which is a pressed body of the iron-based powder for dust core according to claim 2.

8. A dust core which is a pressed body of the iron-based powder for dust core according to claim 3.

9. A method of manufacturing a dust core, comprising charging the iron-based powder for dust core according to claim 2 into a press mold and pressing the powder.

10. A method of manufacturing a dust core, comprising charging the iron-based powder for dust core according to claim 3 into a press mold and pressing the powder.

11. The iron-based powder for dust core according to claim 1, wherein the median particle size calculated based on cumulative volume frequency of particles of the iron-based powder for dust core is 85 μm or more and 150 μm or less.

12. The iron-based powder for dust core according to claim 2, wherein the median particle size calculated based on cumulative volume frequency of particles of the iron-based powder for dust core is 85 μm or more and 150 μm or less.

13. The iron-based powder for dust core according to claim 3, wherein the median particle size calculated based on cumulative volume frequency of particles of the iron-based powder for dust core is 85 μm or more and 150 μm or less.

14. The iron-based powder for dust core according to claim 6, wherein the median particle size calculated based on cumulative volume frequency of particles of the iron-based powder for dust core is 85 μm or more and 150 μm or less.

15. A dust core which is a pressed body of the iron-based powder for dust core according to claim 11.

16. A dust core which is a pressed body of the iron-based powder for dust core according to claim 12.

17. A method of manufacturing a dust core, comprising charging the iron-based powder for dust core according to claim 11 into a press mold and pressing the powder.

18. A method of manufacturing a dust core, comprising charging the iron-based powder for dust core according to claim 12 into a press mold and pressing the powder.

* * * * *